United States Patent

[11] 3,547,081

[72] Inventor Petrus J. Geerlings
     P.O. Box 179, Waterloo, Iowa 50704
[21] Appl. No. 740,527
[22] Filed June 27, 1968
[45] Patented Dec. 15, 1970

[54] ANIMAL FEEDER WITH FEED MOISTENING MECHANISM
     11 Claims, 7 Drawing Figs.
[52] U.S. Cl. .................................................. 119/51.11,
     119/52, 119/51.5
[51] Int. Cl. ..................................................... A01k 05/02
[50] Field of Search ........................................... 119/51, 52,
     51.11, 52.1, 51.5, 53, 53.5; 222/70, 132, 361

[56] References Cited
     UNITED STATES PATENTS
     1,258,069  3/1918  Weyeneth ................... 119/53.5
     2,226,476  12/1940 Maggart ...................... 119/53.5
     2,485,832  10/1949 Keagle ........................ 119/53.5
     2,642,837  6/1953  Schroeder ................... 119/52
     2,766,725  10/1956 Sievers ....................... 119/51.5
     3,196,835  7/1965  Bergevin ..................... 119/51.11
     3,233,590  2/1966  Venca .......................... 119/51.5
     3,292,584  12/1966 Broderick .................... 119/51
     3,339,529  9/1967  Holste et al. ................ 119/51.5
     3,368,529  2/1968  Ferris .......................... 119/51.11

Primary Examiner—Aldrich F. Medbery
Attorney—A. Yates Dowell and A. Yates Dowell, Jr.

ABSTRACT: A feeder for supplying feed for animals and for adding moisture thereto without excess and thereafter removing the moist feed from the moistening area and depositing the same in a feeding area for consumption by the animals with or without additional moisture added, and providing such feeder with means to selectively control the time and rate of the feeding continuously or at selected intervals.

PATENTED DEC 15 1970

INVENTOR.
Petrus J. Geerlings
BY

ATTORNEYS

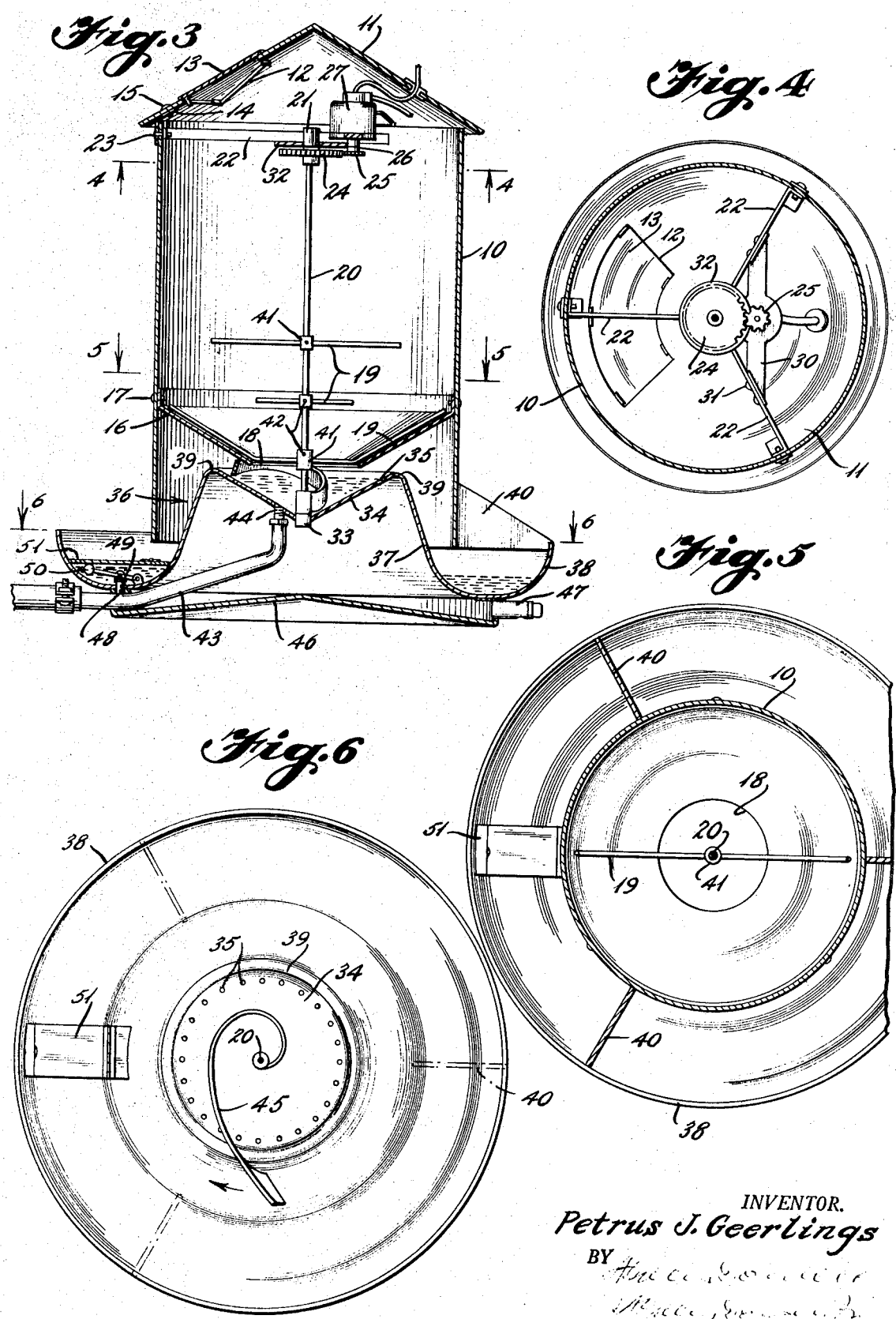

3,547,081

ANIMAL FEEDER WITH FEED MOISTENING MECHANISM

BACKGROUND OF THE INVENTION

1. Field of the Invention

The invention is in the field of animal feeders which contain feed in bulk and include means for the fractional discharge of such feed.

2. Description of the Prior Art

Feeders have been produced for containing feed in bulk to be dispensed to animals, some of which feeders have included means for adding water without satisfactory control of the amount. This has resulted in the animals consuming excess water, such excess water being retained in the bodies of the animals instead of the animals receiving the proper proportion of feed and water for best growth and development. Prior art feeders also have failed to control the rate and timing of the feeding.

SUMMARY OF THE INVENTION

In the feeding of livestock, such as hogs, cattle and the like, one of the important ingredients has been corn. In some cases the corn has been dried or dehydrated to preserve the same so that it can be fed to the animals substantially the year round. Normally dried corn is hard and difficult for the animals to chew and much of the corn has been indigestible and not readily assimilated in the body system. The present invention is an animal feeder having means for adding moisture to the corn or other grain and thereby replacing the moisture before the grain is fed to the animals. Simultaneously it is desirable that the animals do not receive an excessive amount of moisture as this adversely affects the quality of the meat. Accordingly the present invention includes means for preventing the discharge of excess moisture to the feeding areas, as well as providing means for controlling the rate of discharge from the moistening area to the feeding area and also controlling the length of time that the discharging of the feed actually takes place.

OBJECTS OF THE INVENTION

It is an object of the invention to provide a simple, practical, inexpensive animal feeder for feeding a supply of grain or other feed with variable speed means for controlling the rate and time of feeding, as well as the amount of moisture added in accordance with the requirements for the wellbeing of the animals fed.

Another object of the invention is to provide an animal feeder having a bin with positive agitating means causing the dry feed to flow freely to a moistening area and positive means for moving the feed with the moisture added from the moistening area into an independent feeding area and with positive means for adding moisture if and when needed and in a controlled amount to the feeding area.

Other objects and advantages of the invention will be apparent from the following description considered in conjunction with the accompanying drawings.

BRIEF DESCRIPTION OF THE DRAWINGS

FIG. 3, a vertical section on the line 3–3 of FIG. 1;
FIG. 4, a horizontal section on the line 4–4 of FIG. 3;
FIG. 5, an enlarged horizontal section on the line 5–5 of FIG. 3;
FIG. 6, an enlarged horizontal section on the line 6–6 of FIG. 3 disclosing the soaking area and the transfer mechanism.

DESCRIPTION OF THE PREFERRED EMBODIMENTS

Figure 1:
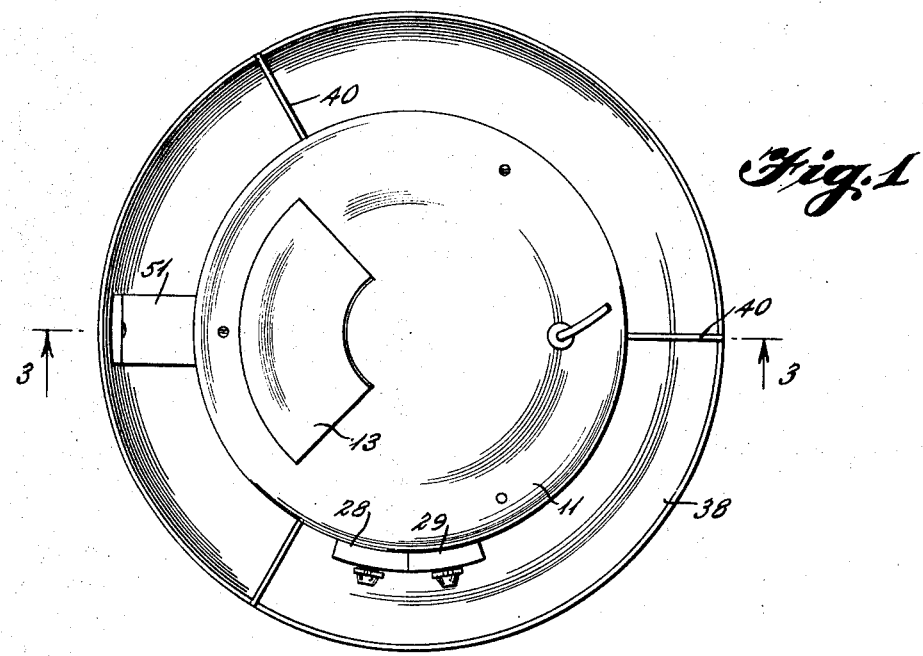
FIG. 1 is a top plan view.
Figure 2:
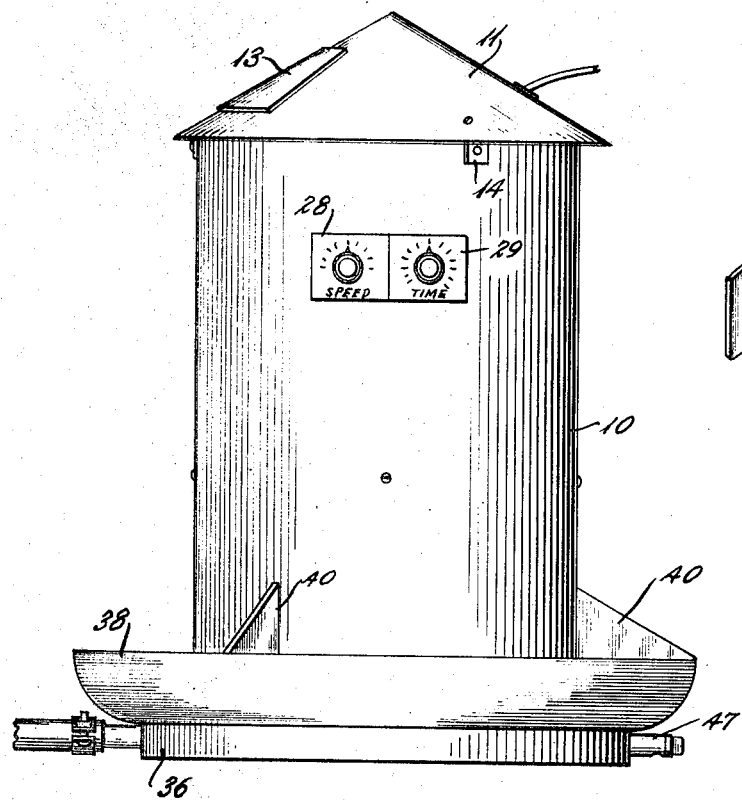
FIG. 2, a side elevation.

With continued reference to the drawings, a storage bin or container 10 has an upright wall and a roof 11 with a filling opening 12 and a cover 13 therefor. The roof 11 is mounted by means of brackets 14 and fasteners 15 onto the bin 10. The bin 10 has a bottom member 16 attached by fasteners 17 to the wall thereof.

The bottom member 16 is of inverted frustoconical form tapering or being inclined downwardly to a discharge opening 18 through which grain or other feed in the bin is adapted to pass by gravity after it is loosened by means of agitators 19 attached to a shaft 20 extending generally vertically and centrally within the bin. The upper end of the shaft 20 is supported by a bearing 21 in a spider or triangular support 22 secured by fasteners 23 to the wall of the container 10. Mounted in fixed relation on the shaft 20 beneath the bearing 21 is a gear 24 which meshes with a drive gear 25 on a shaft 26 of a variable speed motor 27 by means of which the speed of rotation of the shaft 20 and movement of the grain may be controlled, as will be later described.

The motor 27 may be regulated by a speed control 28 on the exterior of the container 10 for controlling the rate of discharge of the feed as well as a timer control 29 for controlling the duration of feed discharge. The motor 27 is supported by means of a bracket 30 secured by rivets or other fasteners 31 to two legs of the spider or triangular supports 22. In order to prevent the grain supplied through the opening 12 from interfering with the gear 24, a shield 32 is attached to the spider or triangular supports 22. Thus the shaft 20 is driven by the motor 27 through gears 25 and 24.

The lower end of the shaft 20 is journaled in a thrust bearing 33 mounted in a generally conical wall 34 having drainage perforations 35 around the upper periphery thereof. This conical wall has a relatively short axis in which the bearing 33 is mounted and this wall forms a receptacle or basin in the upper portion of a water tank 36 having a sidewall 37 which slopes outwardly and downwardly to provide an annular trough 38 for reception of feed supplied to the animals. The conical wall 34 forms in effect a shallow container for the feed and as the feed is moistened it is discharged over the upper rim 39 of the wall so it can pass into the trough 38. The wall of the bin 10 terminates just below the top of the trough 38 and is maintained by means of brackets or gussets 40, any desired number of which may be employed as considered necessary, three being illustrated, thus affording the animals free access to the feeding trough.

In order to insure the breaking up of the bulk of the feed within the bin 10 sufficiently to allow it to drop by gravity through the opening 18, the agitators 19 are adjustably mounted by means of bushings or collars 41 attached to the shaft 20 by means of a set screw or other fastener 42.

It will be apparent from the foregoing that bulk feed in the bin 10 may drop by gravity onto the perforated conical wall of the basin 34 where it will receive moisture supplied by a conduit 43 having an adjustable valve 44 located within the basin. The valve 44 normally permits a steady trickle of water into the basin. The openings 35 in the perforated wall 34 are below the rim 39 to insure the retention of the proper amount of water within the tank 36 and to provide a drainage so that excess water cannot enter the trough 38.

Figure 7:
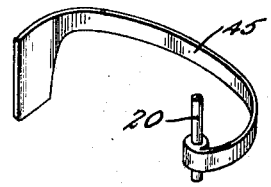
FIG. 7, an enlarged perspective view of the grain impeller.

In order to cause feed deposited in the basin 34 to travel upwardly from the center and over the rim 39, an impeller or paddle 45 is secured to the lower portion of the shaft 20 and driven by the motor 27. Such impeller is of a generally helical configuration (FIGS. 6 and 7) and is spaced slightly above the wall 34 to move the feed upwardly and outwardly from the center 39 from whence it will pass downwardly into the feed trough 38.

The tank 36 preferably has a bottom wall 46 below the basin 34 and defining a watertight compartment which may be provided with a drain 47 by which water may be drained from the tank when it is desired. The feed trough 38 may be supplied with water through a connection 48 of the pipe 46 and such trough may have a valve 49 controlled by a float 50 protected by a housing 51. Thus the trough may be supplied with additional water for mixing with the feed to form a slop for the hogs or other animals. The feeder is in effect a mixer. One of the most important features of this feeder is the fact that besides making slop by adding water in the feed trough, the same slop can be made by discharging dry matter into the feed troughs which are half full of water, all the time controlled by some sort of a float. This is the modern way to feed slop, because the pigs themselves will do the stirring and mixing and would consume more water, which is very essential in slop feeding.

It is the other way around when you soak corn. Corn has a tendency to go to the bottom of the feeder, and the hogs have no choice but to gulp down a lot of water to get to the corn. The present invention, of course, takes the water out of the corn which is of importance.

I claim:

1. A feeder for animals comprising a bulk feed bin having an upright axis and wall structure defining a lower substantially circular discharge opening, a floor beneath said discharge onto which feed is adapted to be received from said bin, said floor having a periphery substantially equally spaced from the discharge opening forming wall and providing a substantially uniform discharge passage from said bin around said floor, a trough around the periphery of said floor for the receipt of feed discharged from said floor, a shaft disposed axially within said bin, discharge means connected to the lower portion of said shaft for discharging feed from and beyond the periphery of said floor into said trough, said discharge means extending from said shaft beyond the periphery of said floor at an elevation above and in a position overlying said trough to engage and spread feed piling up in said trough, power means connected to drive said shaft, and means for controlling the supply of feed in said trough.

2. A feeder as set forth in claim 1 and means for adding moisture to the feed between its passage from said bin to said trough.

3. A feeder as set forth in claim 1 and means for adding moisture to the feed between its passage from said bin to said trough, and control means for the amount of moisture added from dry to excessively wet.

4. A feeder as set forth in claim 1 and means for adding moisture directly to and maintaining a liquid level in said trough.

5. The structure of claim 1 and variable speed means for controlling the rate of dispensing the feed.

6. The structure of claim 1 and timing means for controlling the time and duration of feeding.

7. A feeder as set forth in claim 1 having means for controlling the amount of moisture, the rate of dispensing of the feed, and the time and duration of the feeding.

8. The feeder of claim 1 having partitions located in longitudinally spaced relation within said trough.

9. The feeder of claim 1 in which the portion of the discharge means which extends beyond the periphery of the floor depends below the periphery of the floor.

10. A feeder as set forth in claim 1 in which said floor provides a container for liquid and feed for presoaking the feed prior to its removal by said discharge means.

11. A feeder as set forth in claim 10 in which the container portion of the receptacle is frustoconical with a relatively short axis and into which the water is supplied near the bottom.